United States Patent
Furminger et al.

(12)

(10) Patent No.: US 6,430,579 B1
(45) Date of Patent: Aug. 6, 2002

(54) PARTITION SUPPORT TOOL TO MAINTAIN/ SERVICE MULTIPLE COPIES OF A DATABASE

(75) Inventors: Samantha B. Furminger, Endicott; Mary P. Hill, Vestal, both of NY (US); E. Glenn Huff, Fort Worth, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/473,859

(22) Filed: Dec. 29, 1999

(51) Int. Cl.[7] .............................................. G06F 17/30
(52) U.S. Cl. ........................ 707/203; 703/204; 703/202; 709/206; 709/202
(58) Field of Search ................................. 707/202, 203, 707/204; 709/202, 206

(56) References Cited

U.S. PATENT DOCUMENTS

| | | | |
|---|---|---|---|
| 4,853,843 A | | 8/1989 | Ecklund ..................... 707/203 |
| 5,530,807 A | * | 6/1996 | Baker et al. ................. 709/226 |
| 5,675,727 A | | 10/1997 | Watanabe ..................... 714/20 |
| 5,706,499 A | | 1/1998 | Kleewein et al. .............. 707/10 |
| 5,831,560 A | * | 11/1998 | Gelfenbain .................. 341/106 |
| 6,256,773 B1 | * | 7/2001 | Bowman-Amuah ............ 717/1 |

* cited by examiner

Primary Examiner—Charles L. Rones
(74) Attorney, Agent, or Firm—Scully, Scott, Murphy & Presser; John R. Pivnichny

(57) ABSTRACT

A method and system for maintaining copies of a database at a plurality of locations. The method comprises the steps of providing a codeset list having codes and corresponding text, receiving a new codeset list, and comparing the new codeset list to the codeset list to determine differences and creating a log of the differences. A second codeset list is formed comprising the codeset list and the new codeset list, the new codeset list is sent to the plurality of locations, and one of the copies at the plurality of locations is selected for migration. The method further comprises the steps of finding documents at the one of the plurality of locations that contains at least one of the differences in the log, resolving codes for the differences from the second codeset list, and modifying the documents using the second codeset list.

15 Claims, 6 Drawing Sheets

BPM R1.5 Service DB-Deployed Partition Info-Lotus Notes

☐ ☐☐☐☐☐ ☐☐☐☐☐ ☐☐☐☐☐ ☐☐☐☐☐
　　　　　{32a}　　　{32b}

☐ Maintenance (Log Only)　☐ Maintenance (Make Updates)　☐ Mary (Prepare for Migr Tests) ~32c

| Description | L | Server Directory | |
|---|---|---|---|
| Development | | -bpmtmigr | bpmmndx.nsf & bpmbpdx.nsf |
| DK - BPMT BP | | -bpmtmigr | bpmmpdk.nsf & bpmbpdk.nsf |
| FR - BPMT BP | | d03pin02/03/N/PINFO - c_dir\crm\bpmtfr | bpmmfr.nsf & bpmbpfr.nsf |
| GB - BPMT BP | | D03PIN02/03/N/PINFO - c_dir\crm\bpmtgb | bpmmgb.nsf & bpmbpgb.nsf |
| HK - BPMT BP | | d03pin02/03/N/PINFO - c_dir\crm\bpmthk | bpmmhk.nsf & bpmbphk.nsf |
| JP - BPMT BP | | d03pin02/03/N/PINFO - c_dir\crm\bpmtip | bpmmip.nsf & bpmbpip.nsf |
| KR - BPMT BP | | d03pin02/03/N/pINFO - c_dir\crm\bpmtkr | bpmmkr.nsf & bpmbpkr.nsf |
| S5 - BPMT BP | | d03pin02/03/N/PINFO - c_dir\crm\bpmts5 | bpmms5.nsf & bpmbps5.nsf |
| S6 - BPMT BP | | d03pin02/03/N/PINFO - c_dir\crm\bpmts6 | bpmms6.nsf & bpmbps6.nsf |

| Log Created Date | Finished | Partition Update |
|---|---|---|
| Log - Lookup Updates | | |
| 05/18/99 03:47:18 PM | 04/08/99 11:22:32 AM | S1 - Partition |
| 05/18/99 03:47:18 PM | 04/08/99 11:09:34 AM | S1 - Partition |
| 05/18/99 03:47:18 PM | 04/08/99 01:44:33 PM | S1 - Partition |
| 05/18/99 03:47:18 PM | 03/18/99 02:13:27 PM | Development |
| 05/18/99 03:47:17 PM | 03/18/99 11:00:49 AM | KR - BPMTBP |
| 05/18/99 03:47:17 PM | 03/18/99 10:56:48 AM | HK - BPMTBP |
| 05/18/99 03:47:17 PM | 03/18/99 10:52:47 PA | JP - BPMTBP |
| Log - 1.5 Migration | | |
| 05/18/99 03:47:18 PM | 04/08/99 | S5 - Partition |
| 05/18/99 03:47:18 PM | 04/08/99 | S6 - Partition |
| 05/18/99 03:47:18 PM | 04/08/99 | S6 - Partition |
| 05/18/99 03:47:18 PM | 03/18/99 | S5 - Partition |
| 05/18/99 03:47:17 PM | 03/18/99 | S5 - Partition |

FIG. 4

FIG. 5
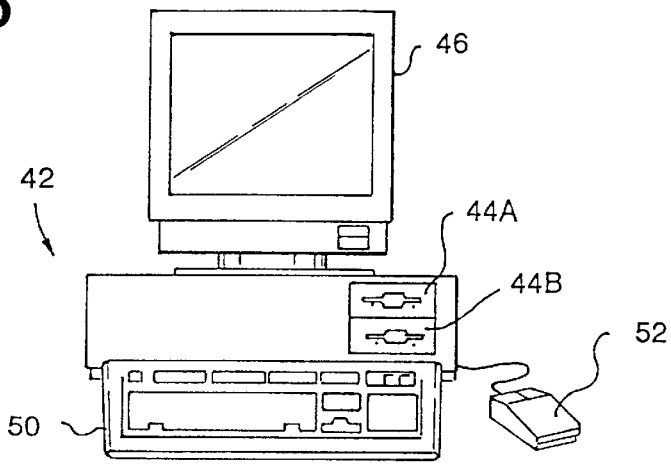
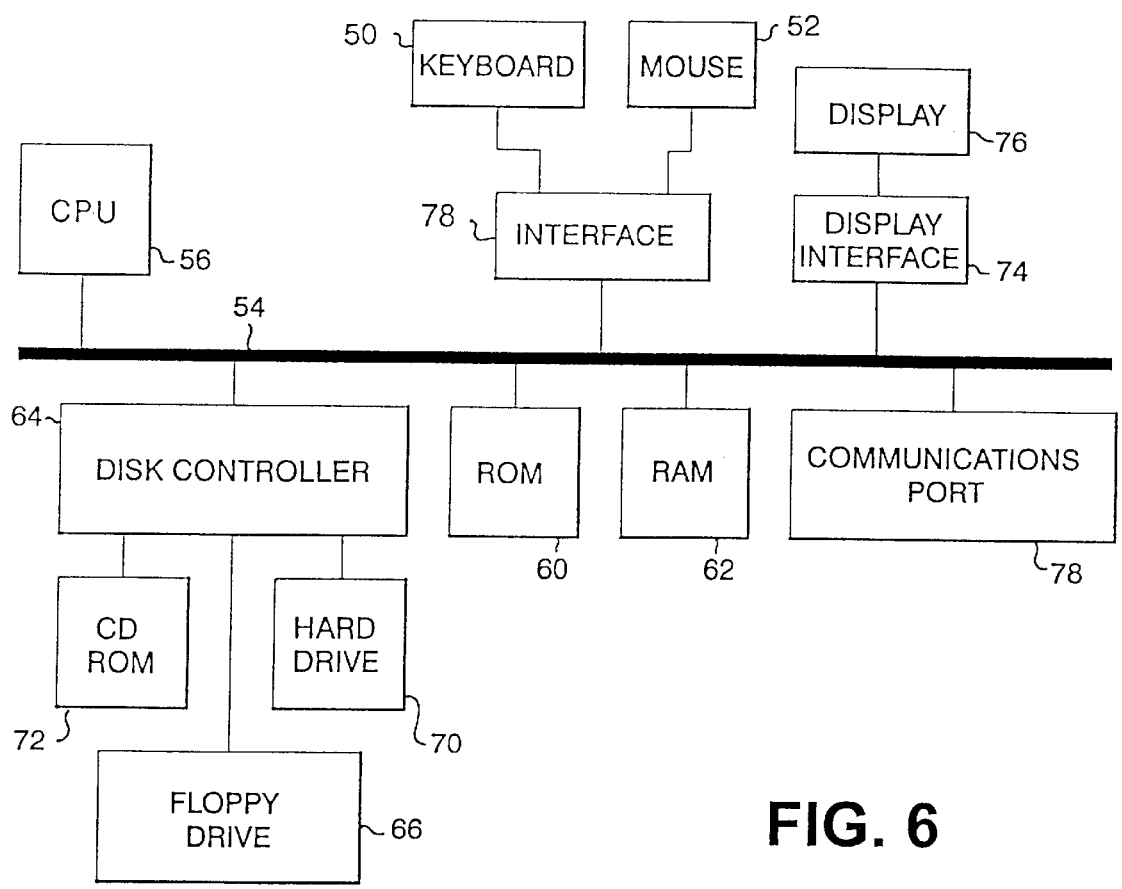
FIG. 6

PARTITION SUPPORT TOOL TO MAINTAIN/SERVICE MULTIPLE COPIES OF A DATABASE

BACKGROUND OF THE INVENTION

This invention generally-relates to distributed data base systems, and more specifically, to maintaining copies of a database at a plurality of locations.

The purpose of a data base system is to store data reliably and to process valid, authorized read and write requests on that data. A database system provides a uniform interface for accessing data by-executing transactions. The purpose of a distributed database system is to provide global database service to users at a collection of sites. A distributed data base system is a coalition of sites that share access to a set of data. Each site maintains directory information about the data so that each site has knowledge of all data stored by the database system.

A distributed database must, under normal operating conditions, maintain internal and mutual consistency of the data stored by the system. Internal consistency is maintained if all database updates performed by committed transactions are reflected in the database, none of the updates performed by uncommitted transactions are reflected in the database, and no transaction is allowed to read a data value written by another transaction that is not yet committed.

Maintaining consistency among a large number of distributed database can be difficult, however. In particular, in an environment where the same maintenance procedures need to be applied to many copies of the same database, it can be very time consuming to perform the maintenance, one copy at a time. For example, in the past, if a piece of maintenance needed to be performed, an agent was developed and pasted into each copy of the database and then executed. If maintenance needed to be performed on each of two databases at 40 locations, for example, then the agent needed to be pasted into 80 databases.

Also, in the past, commonly, when migrating to the next release, an agent was developed as part of the new database design and deployed with the new version. To perform the migration, an administrator needed to open each database and execute the migration agent. In addition, in the past, with many systems, when lookup documents needed to be updated, the administrator selected and copied the new lookup document to a clipboard and then manually opened each of the databases, deleted the old lookup documents and pasted the new document. With a system having scores, or even hundreds, of distributed databases, this is very time-consuming.

SUMMARY OF THE INVENTION

An object of this invention is to improve methods and systems for maintaining distributed databases.

Another object of this invention is to reduce the time required to maintain distributed databases.

A further object of the present invention is to log all maintenance activity performed on a distributed database, in a consistent manner in one database.

Still another object of the present invention is to provide a support tool that can be used for various types of support activities when supporting large numbers of databases. These support activities include, for example, updating lookup documents, migrating from one release of an application to the next release, and fixing production problems.

These and other objectives are attained with a method and system for maintaining copies of a database at a plurality of locations. The method comprises the steps of providing a codeset list having codes and corresponding text, receiving a new codeset list, and comparing the new codeset list to the codeset list to determine differences and creating a log of the differences.

A second codeset list is formed comprising the codeset list and the new codeset list, the new codeset list is sent to the plurality of locations, and one of the copies at the plurality of locations is selected for migration. The method further comprises the steps of finding documents at the one of the plurality of locations that contains at least one of the differences in the log, resolving codes for the differences from the second codeset list, and modifying the documents using the second codeset list.

The support tool of this invention reduces maintenance support time in the environment where many copies of the same database are being supported. The support tool is a separate database that contains one document for each copy of the database being supported. Each partition document contains the basic information, such as server, path and filename, needed to locate the referenced database.

When a new piece of maintenance needs to be applied, the maintenance can be written as an action, and the action can be performed against each partition by selecting the partition document. General routines may be used by each piece of maintenance for activities such as logging and accessing the partition, so that each action works in the same general manner even though the maintenance itself may be different.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 3 is an example of a view in the support tool of the present invention.

FIG. 4 is a view of the log generated by the maintenance tool of this invention.

FIGS. 5 and 6 illustrate a computer system that may be used in the practice of this invention.

DETAILED DESCRIPTION OF THE PREFERRED EMBODIMENT

Figure 1:
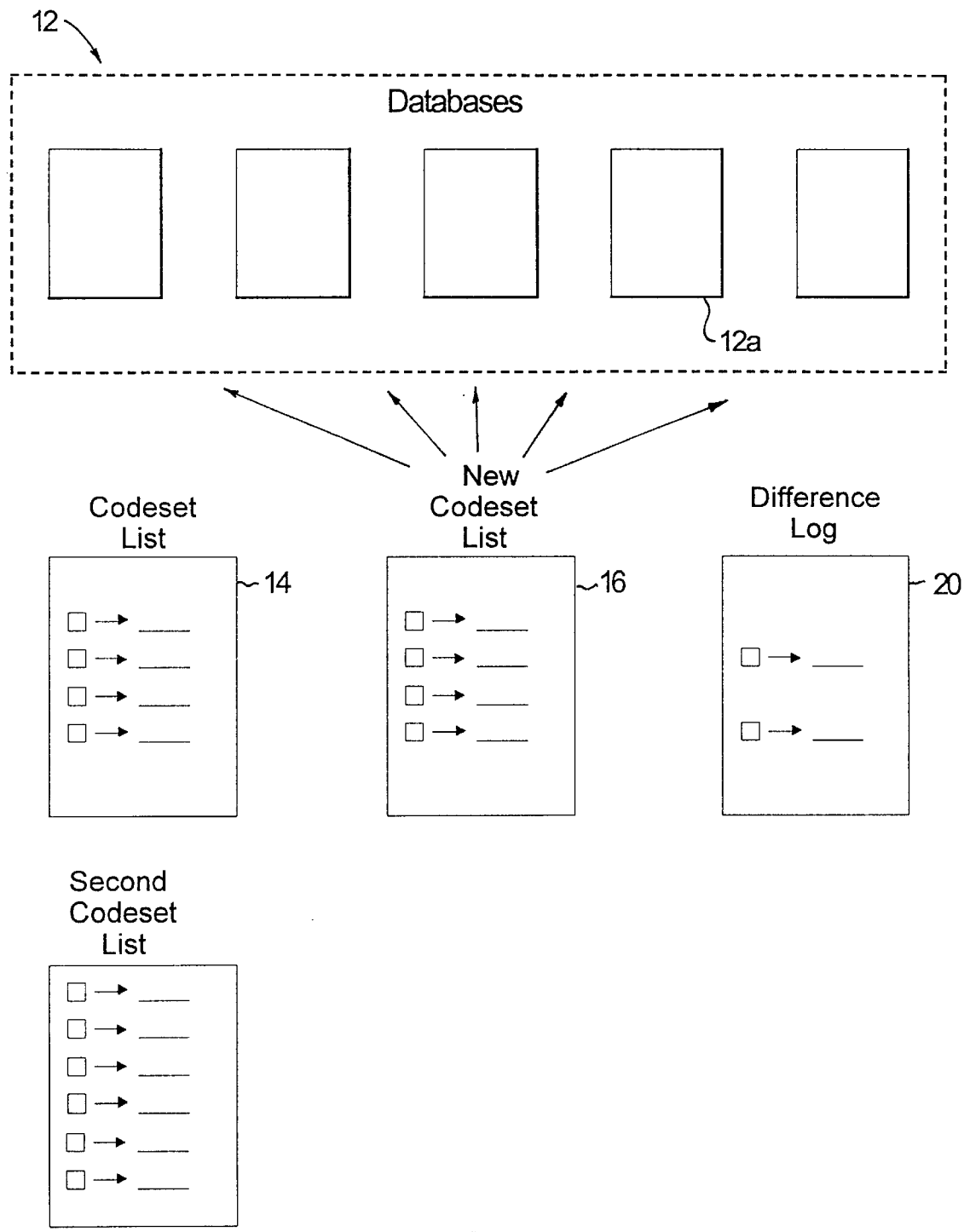
FIG. 1 diagrammatically illustrates the present invention.
Figure 2:
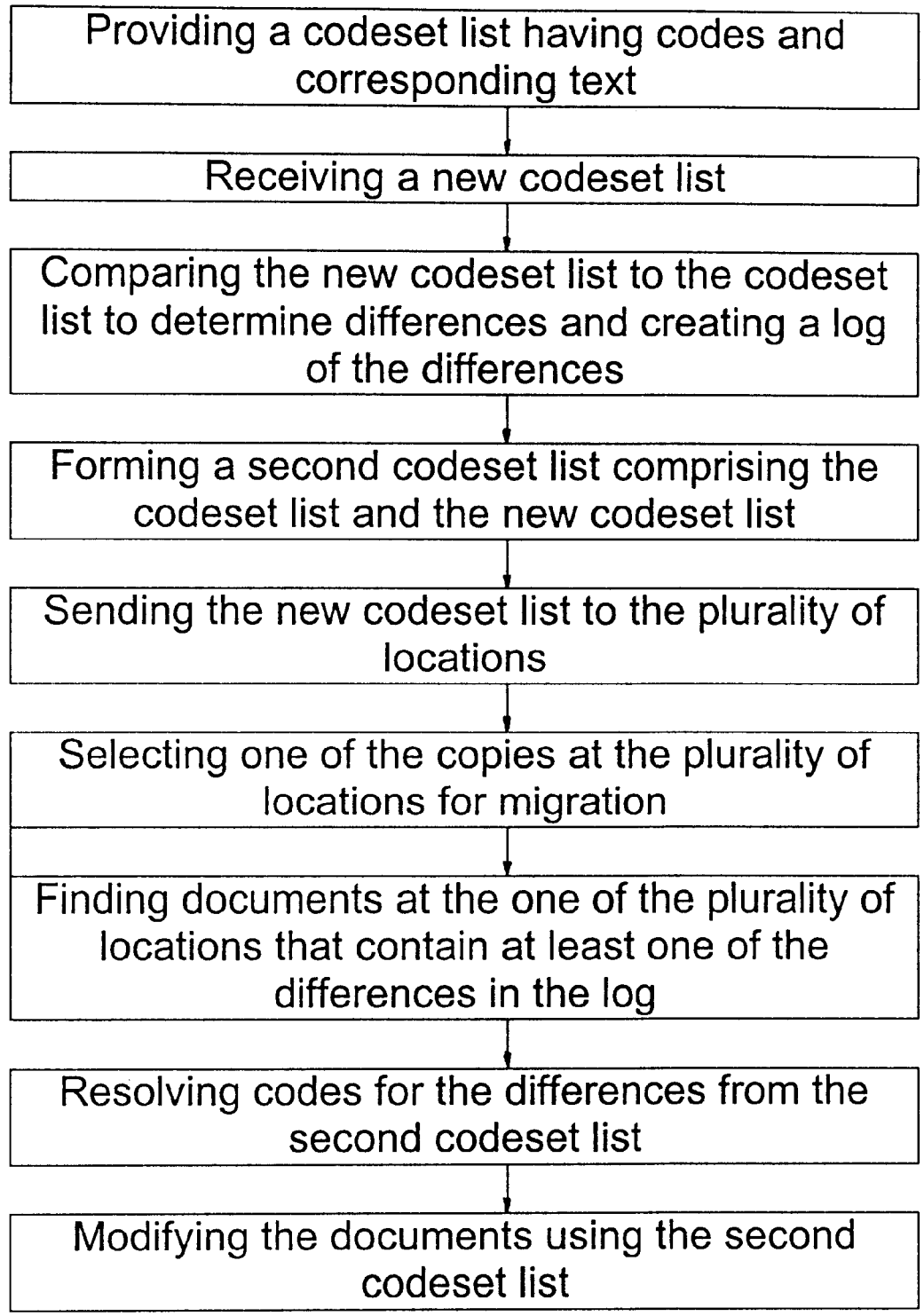
FIG. 2 is a flow chart outlining a preferred method for performing this invention.

With reference to FIGS. 1 and 2, the present invention is a method and system for maintaining copies 12 of a database at a plurality of locations. The method comprises the steps of providing a codeset list 14 having codes and corresponding text, receiving a new codeset list 16, and comparing the new codeset list to the codeset list 14 to determine differences and creating a log 20 of the differences.

A second codeset list 22 is formed comprising the codeset list 14 and the new codeset list 16, the new codeset list 16 is sent to the plurality of locations, and one of the copies 12a at the plurality of locations is selected for migration. The method further comprises the steps of finding documents at the one of the plurality of locations that contains at least one of the differences in the log 20, resolving codes for the differences from the second codeset list 22, and modifying the documents using the second codeset list. Preferably, when the new codeset list is sent to the plurality of locations, the second codeset list is also sent to those plurality of locations.

This application, among other advantages, allows codesets (mappings of numeric codes to text descriptions) to be dynamically managed in a large database so that historical values of the mappings are automatically maintained for display, and migration to the new mappings is managed from a central facility in a controlled fashion.

FIG. 3 is an example of the main view in the partition support tool. One document is displayed for each copy of the database being supported. The server, directory and filename information are displayed in the view, and referenced at 30a, 30b and 30c, respectively. Three maintenance buttons 32a, 32b and 32c are visible. Alternatively, it may be noted, these maintenance buttons could be accessed via the pulldown Action button.

The first maintenance button 32a performs some maintenance against a partition, but does not actually save the changes. A log is generated specifying which changes would be made if the maintenance were actually performed. This log can be reviewed by the users or the Administrator before using the second button 32b to actually perform the maintenance.

FIG. 4 is a view of the logs generated by the maintenance. This view displays logs created for two types of maintenance actions—a lookup update and a migration. The view also shows which partition received the maintenance.

The support tool of this invention reduces maintenance support time in the environment where many copies of the same database are being supported. The support tool is a separate database that contains one document for each copy of the database being supported. Each partition document contains the basic information, such as server, path and filename, needed to locate the referenced database.

When a new piece of maintenance needs to be applied, the maintenance can be written as an action, and the action can be performed against each partition by selecting the partition document. General routines may be used by each piece of maintenance for activities such as logging and accessing the partition, so that each action works in the same general manner even though the maintenance itself may be different.

The partition support tool of the present invention can be used for various types of support activities when supporting large numbers of databases. For example, the tool may be used to update lookup documents, to migrate from one release of an application to the next release, and to fix production problems. With this invention, all of these tasks, and many others, may now be performed from one database by selecting the partition and pressing one button.

As will be understood by those of ordinary skill in the art, the present invention may be carried out on any suitable computer network. FIG. 5 illustrates, as an example, a computer of a type suitable for use in such a network. Viewed externally in FIG. 5, a computer system has a central processing unit 42 having disk drives 44A and 44B. Disk drive indications 44A and 44B are merely symbolic of a number of disk drives that might be accommodated by the computer system. Typically, these would include a floppy disk drive such as 44A, a hard disk drive (not shown externally) and a CD ROM drive indicated by slot 44B. The number and type of drives vary, usually, with different computer configurations. The computer has the display 46 upon which information is displayed. A keyboard 50 and a mouse 52 are normally also available as input devices.

FIG. 6 shows a block diagram of the internal hardware of the computer of FIG. 5. A bus 54 serves as the main information highway, interconnecting the other components of the computer. CPU 56 is the central processing unit of the system, performing calculations and logic operations required to execute programs. Read only memory 60 and random access memory 62 constitute the main memory of the computer. Disk controller 64 interfaces one or more disk drives to the system bus 54. These disk drives may be floppy disk drives, such as 66, internal or external hard drives, such as 70, or CD ROM or DVD (Digital Video Disks) drives, such as 72. A display interface 74 interfaces a display 76 and permits information from the bus to be viewed on the display. Communications with external devices can occur over communications port 78.

Figure 7:
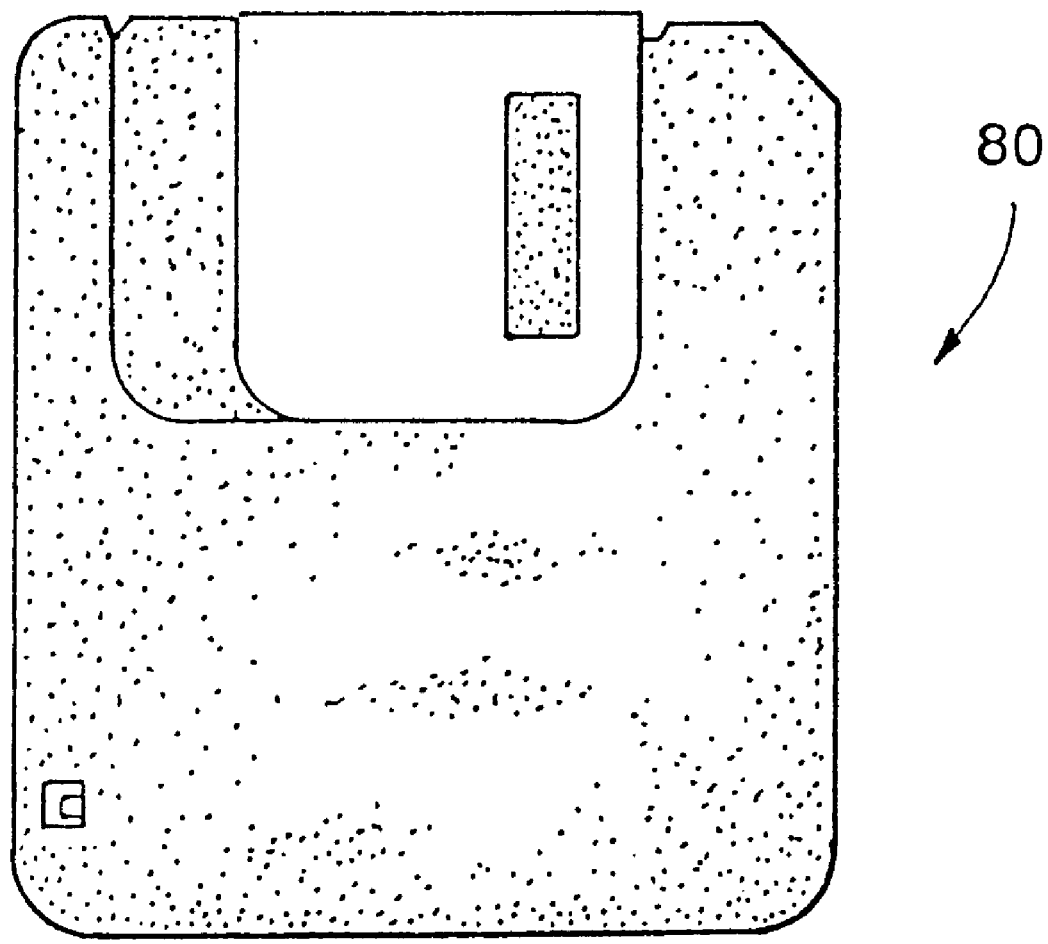
FIG. 7 shows a memory medium that may be used to hold a computer program for implementing the present invention.

FIG. 7 shows a memory medium 80 that may be used to hold a computer program for implementing the present invention, and this medium may be used in any suitable way with any appropriate computer to carry out the invention. Typically, memory media such as a floppy disk, or a CD ROM, or a Digital Video Disk will contain the program information for controlling the computer to enable the computer to perform its functions in accordance with the invention.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of maintaining copies of a database at a plurality of locations, comprising the steps of:

providing a codeset list having codes and corresponding text;

receiving a new codeset list;

comparing the new codeset list to the codeset list to determine differences and creating a log of the differences;

forming a second codeset list comprising the codeset list and the new codeset list;

sending the new codeset list to the plurality of locations;

selecting one of the copies at the plurality of locations for migration;

finding documents at the one of the plurality of locations that contain at least one of the differences in the log;

resolving codes for the differences from the second codeset list; and modifying the documents using the second codeset list.

2. A method according to claim 1, wherein the codesets are mappings of numeric codes to text descriptions.

3. A method according to claim 2, further comprising the step of dynamically managing the codesets so that historical values of the mappings are maintained for display.

4. A method according to claim 2, further comprising the step of dynamically managing the codesets so that migration to new mappings is managed from a central facility in a controlled fashion.

5. A method according to claim 1, wherein the sending step includes the step of sending the new codeset list and the second codeset list to the plurality of locations.

6. A system for maintaining copies of a database at a plurality of locations, comprising:

means for providing a codeset list having codes and corresponding text;

means for receiving a new codeset list;

means for comparing the new codeset list to the codeset list to determine differences and creating a log of the differences;

means for forming a second codeset list comprising the codeset list and the new codeset list;

means for sending the new codeset list to the plurality of locations;

means for selecting one of the copies at the plurality of locations for migration;

means for finding documents at the one of the plurality of locations that contain at least one of the differences in the log;

means for resolving codes for the differences from the second codeset list; and means for modifying the documents using the second codeset list.

7. A system according to claim 6, wherein the codesets are mappings of numeric codes to text descriptions.

8. A system according to claim 7, further comprising means for dynamically managing the codesets so that historical values of the mappings are maintained for display.

9. A system according to claim 7, further comprising means for dynamically managing the codesets so that migration to new mappings is managed from a central facility in a controlled fashion.

10. A system according to claim 6, wherein the sending means includes means to send the now codeset list and the second codeset list to the plurality of locations.

11. A program storage device readable by machine, tangibly embodying a program of instructions executable by the machine to perform method steps for maintaining copies of a database at a plurality of locations, said method steps comprising:

providing a codeset list having codes and corresponding text;

receiving a new codeset list;

comparing the new codeset list to the codeset list to determine differences and creating a log of the differences;

forming a second codeset list comprising the codeset list and the new codeset list;

sending the new codeset list to the plurality of locations;

selecting one of the copies at the plurality of locations for migration;

finding documents at the one of the plurality of locations that contain at least one of the differences in the log;

resolving codes for the differences from the second codeset list; and modifying the documents using the second codeset list.

12. A program storage device according to claim 11, wherein the codesets are mappings of numeric codes to text descriptions.

13. A program storage device according to claim 12, wherein said method steps further comprise dynamically managing the codesets so that historical values of the mappings are maintained for display.

14. A program storage device according to claim 12, wherein said method steps further comprise dynamically managing the codesets so that migration to new mappings is managed from a central facility in a controlled fashion.

15. A program storage device according to claim 11, wherein the sending step includes the step of sending the new codeset list and the second codeset list to the plurality of locations.

* * * * *